Dec. 31, 1957  C. H. WILLSEY  2,818,096
MECHANISM FOR SEPARATING EGG WHITES FROM EGG YOLKS
Filed Nov. 2, 1953  5 Sheets-Sheet 1

Fig-1

INVENTOR.
Charles H. Willsey
BY
Cromwell, Greist & Warden
Attys.

Dec. 31, 1957 C. H. WILLSEY 2,818,096
MECHANISM FOR SEPARATING EGG WHITES FROM EGG YOLKS
Filed Nov. 2, 1953 5 Sheets-Sheet 2

INVENTOR.
Charles H. Willsey
BY
Cromwell, Greist & Warden
Attys.

Dec. 31, 1957 C. H. WILLSEY 2,818,096
MECHANISM FOR SEPARATING EGG WHITES FROM EGG YOLKS
Filed Nov. 2, 1953 5 Sheets-Sheet 3

INVENTOR.
Charles H. Willsey
BY
Cromwell, Greist & Warden
Attys.

Dec. 31, 1957 C. H. WILLSEY 2,818,096
MECHANISM FOR SEPARATING EGG WHITES FROM EGG YOLKS
Filed Nov. 2, 1953 5 Sheets-Sheet 5

INVENTOR.
Charles H. Willsey
BY
Cromwell, Greist & Warden
Attys.

United States Patent Office

2,818,096
Patented Dec. 31, 1957

2,818,096

MECHANISM FOR SEPARATING EGG WHITES FROM EGG YOLKS

Charles H. Willsey, Topeka, Kans.

Application November 2, 1953, Serial No. 389,795

7 Claims. (Cl. 146—2)

This invention relates to an egg handling apparatus and is more particularly concerned with improvements in mechanism for receiving from a mechanical egg breaking device the contents of successive eggs, for separating the whites from the yolks and for delivering the whites and the yolks into separate containers.

Egg breaking machines have heretofore been developed which have incorporated mechanism for breaking or cracking successive eggs at a cracking station, for separating the broken or cracked shell portions of each egg and for delivering the contents by gravity to a further mechanism which thereafter separates the albumen or white from the yolk and delivers the albumen and yolk into separate containers. The mechanisms which have been provided in most of the prior machines of this type for separating the albumen and yolk components of the egg contents have not been entirely satisfactory, principally because they do not make adequate provision for elimination of inedible eggs and broken yolks and they do not meet necessary sanitation requirements. Because all the difficulties involved in handling the egg meats have not been solved by the prior mechanisms, such mechanisms have not generally been accepted for commercial adoption.

It is a general object of the present invention to provide an improved mechanism, adapted to be incorporated in an egg breaking machine, for receiving the egg contents from the broken shell portions of successive eggs, for conveying the same past an inspection station where broken yolks and inedible eggs may be removed, and for thereafter separating the egg whites from the yolks and depositing the same in separate containers.

It is a further object of the invention to provide an egg contents separating mechanism adapted for use in an egg cracking machine which is simple in construction, which will operate in an efficient and rapid manner to separate the whites from the yolks, and which can be readily cleaned and maintained in a highly sanitary condition during its operation.

It is another object of the invention to provide an egg contents separating mechanism which comprises a conveyor having mounted in pivoted relation thereon a plurality of containers for receiving, at a cracking station, the contents of successive broken eggs and for carrying the same away from the cracking station along a predetermined path, the containers being first carried past an inspection station where inedible or defective eggs may be removed and then past mechanism for pivoting the containers to an inclined position to separate the whites from the yolks, with a suitable receptacle for receiving the separated whites, and the containers being finally pivoted to dump the yolks into another receptacle as they advance along a further portion of the path of the conveyor.

It is another object of the invention to provide a mechanism for separating egg whites from egg yolks which comprises a conveyor having a plurality of receptacles mounted thereon, with each of the receptacles detachably connected to the conveyor and comprising a base portion or pan for receiving the whole egg contents and a yolk cup portion arranged in angular-relation to the base portion along an open edge of the base portion, the yolk cup being of a size sufficient to receive the yolk and having a portion of the edge thereof free at the top which permits the whites to be drained thereover into a collecting receptacle arranged beneath the conveyor when the receptacle is tilted relative to the conveyor at a predetermined point along the path of travel of the same.

It is another object of the invention to provide in a mechanism for separating egg whites and yolks wherein a plurality of receptacles are mounted on an endless conveyor for receiving the whole egg contents, which receptacles are pivotally connected to the conveyor and so constructed that they may be tilted relative to the conveyor at a predetermined point along the path of movement thereof to allow the egg white to drain over the edge of a cup forming portion which receives and retains the egg yolk, devices which are arranged adjacent the path of the tilted receptacle to engage the mass of egg white as it drains over the edge of the cup and pull the same away from the receptacle whereby to separate a maximum amount thereof from the yolk, the latter being retained in the receptacle for subsequent deposit in a separate container.

It is a further object of the invention to provide in an egg cracking machine an egg contents receiving and separating mechanism comprising a plurality of receiving cups which are pivotally and removably mounted on an endless conveyor, an inspection station adjacent the point where the eggs are broken and dumped into the cups, so that the contents of each cup may be observed by the operator and any cup desired may be completely removed from the conveyor, the mechanism being so arranged that any cup in which a broken yolk is observed or in which an inedible egg has been received may be operated to dump the entire contents thereof into receptacles provided therefor, and a washing mechanism arranged adjacent the path of movement of the conveyor for washing and sterilizing those cups which have been dumped to dispose of or eliminate an inedible or broken egg.

It is another object of the invention to provide an egg separating mechanism which comprises an endless conveyor, and a plurality of receptacles mounted thereon for receiving the egg contents, which receptacles are so constructed that they operate to separate the egg whites from the yolks and deliver the same into separate containers, with the egg white receiving container being arranged adjacent the operator to permit inspection of the egg whites after they are separated from the yolks and allow the operator to separate out and deliver to a separate receiving receptacle any undesired portion of the egg white.

These and other objects and advantages of the invention will be apparent from a consideration of the mechanism which is shown by way of illustration in the accompanying drawing, wherein:

The present mechanism may be employed with any cracking mechanism in which successive eggs are brought up to a cracking station, each successive egg is cracked and the shell separated into two portions permitting the contents to be dumped or allowed to fall by gravity into a receptacle positioned beneath the same. The present mechanism provides a plurality of receptacles mounted on an endless conveyor which moves the receptacles to position them at the cracking station for receiving the whole egg contents and then moves them away along a predetermined path, with each successive receptacle being moved to the cracking station in proper timed relation to receive the contents of a single egg.

Referring to the drawings, the conveyor 10, which is illustrated, comprises an endless chain 11, mounted on sprockets 12, 13, 14 and 15, which are arranged in rectangular relation. The sprockets 12, 13, 14 and 15 are supported on vertically extending shafts 16, 17, 18 and 19, respectively, which are journaled in a suitable supporting frame structure 20. The chain 11 moves in a horizontal path and carries a plurality of egg contents receiving receptacles 21 which are pivotally mounted thereon and adapted to be supported in an outwardly or downwardly extending relation thereto. Each of the receptacles 21 is detachably supported on the chain 11 by means of a bracket 22.

The bracket 22 (Figs. 3 and 4) includes a plate-like horizontal base portion 23 permanently secured to the top of a link of the chain 11 and a vertical portion 24 depending therefrom in outwardly spaced relation and terminating in a reversely bent upwardly extending outer flange portion 25 which provides with the base portion 24 an upwardly opening pocket or recess for receiving a bail 26 attached to the receptacle 21. A generally U-shaped latch member 27 is pivotally mounted at 28 on the base plate 23. The latching member 27 has its leg portions 29 depending along opposite side edges of the vertical base portion 24 and normally positioned in latching relation preventing removal of the bail 26 from the pocket in which it is received. The top or bight portion 30 of the latching member 27 extends upwardly and rearwardly and serves as a handle for pivoting the legs 29 about the pivot 28 in and out of latching relation to permit removal of the bail 26 from the pocket.

Figure 2:
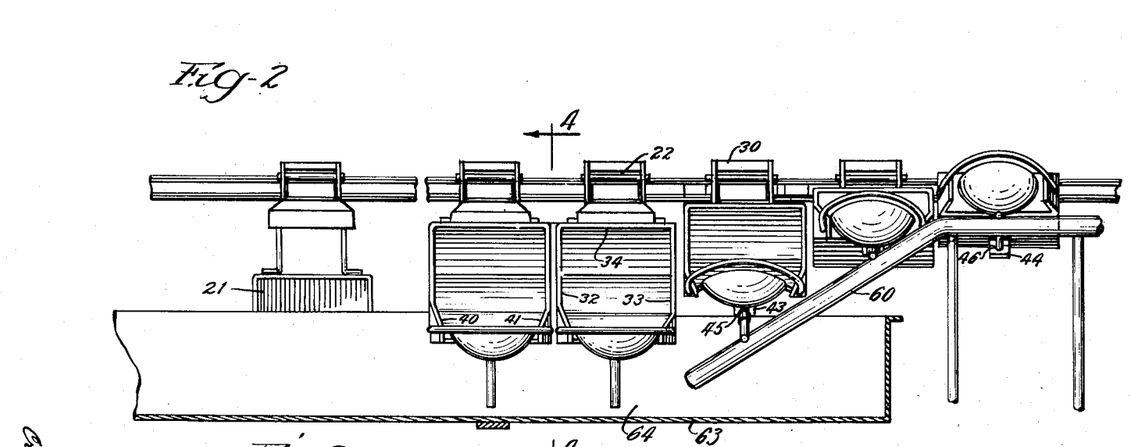
Fig. 2 is a vertical section taken on the line 2—2 of Fig. 1, to an enlarged scale.

Each of the receptacles 21 (Figs. 2, 3 and 4) comprises a pan-like base portion 31 of generally rectangular shape having upstanding side walls 32, 33 and 34 and a bottom wall consisting of two portions 35 and 36, the latter being inclined upwardly towards the open side of the receptacle and terminating in a depressed or recessed portion forming a yolk cup 37 which is secured to the outer edge thereof. The yolk cup 37 is arranged with the upper open edge approximately in the plane of the inclined bottom portion 36 and forms therewith the outer side wall. A rod-like guard member 38, of substantially the same curvature as the top edge 39 of the yolk cup 37, is arranged in outwardly spaced relation to the outer side of the edge 39 of the cup 37, the ends thereof being secured to inwardly angled extensions 40 and 41 on the side walls 32 and 33 of the receptacle 21. With the members arranged as described sufficient space, in the form of a semicircular aperture is allowed around the major portion of the top edge 39 of the yolk cup 37 to permit the egg white to drain down around the edge 39 when the egg contents are moved, by tilting the receptacle 21, from the bottom portion 35 of the receptacle over the bottom portion 36 to the yolk cup 37, the latter being of sufficient size to receive the egg yolk but not the white.

Figure 1:
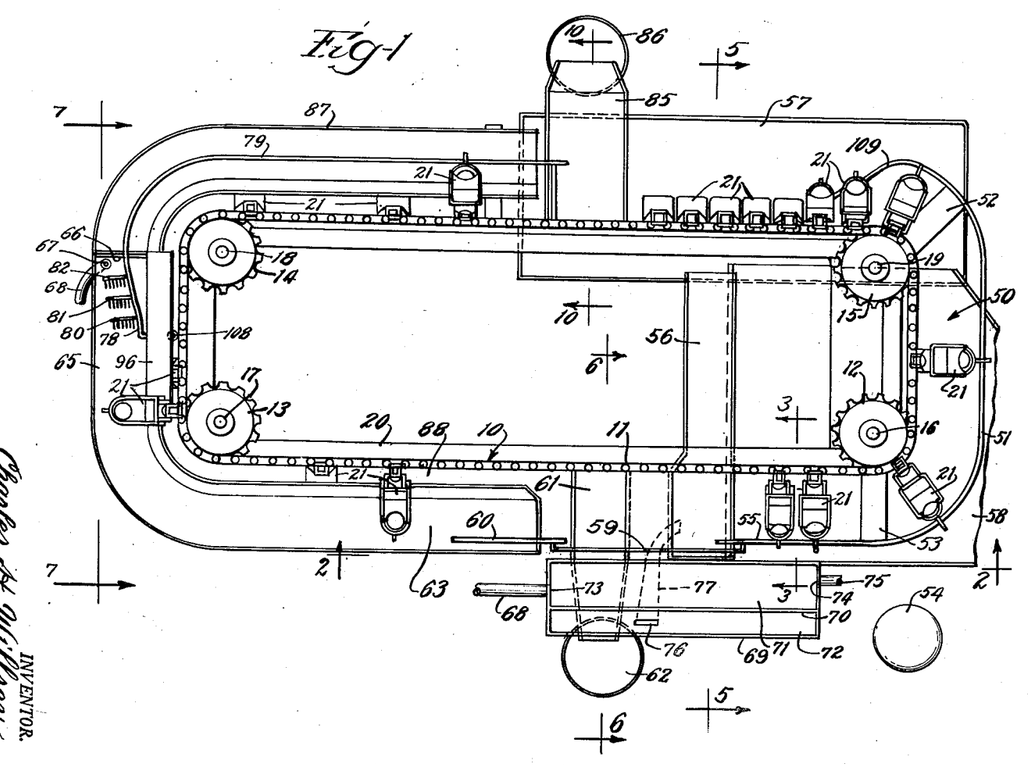
Fig. 1 is a plan view of a separating conveyor having incorporated therein mechanism embodying the principal features of the invention, with portions thereof broken away.

A strap or rod member 42 for selectively supporting the outer end of the receptacle 21 on a support rail 51 (Figs. 1 and 3) is arranged on the lower side of the receptacle 21. The rod 42 is mounted in a pair of spaced angle brackets 43 and 44 which are arranged on the lower surface of the bottom forward wall portion 36 and provided with suitable guideway forming apertures 45 and 46 for receiving in freely sliding relation therein the rod member 42. The inner end of the rod member 42 has an enlarged head 47 which limits the movement of the member 42 in the outer direction by engagement with bracket 44. It is also provided with an enlarged collar formation 48 arranged a predetermined distance from the outer end to limit the movement of the same in the opposite or inward direction by engagement with the bracket 43.

The receptacles 21 are detachably connected to the conveyor chain 11 by the bail members 26 which are attached to the upstanding inner end wall 34 and received in the brackets 22. They are carried by movement of the chain 11 into position at a cracking station, indicated at 50 in Fig. 1, where each receptacle receives the contents of a broken egg.

Figures 3, 4:
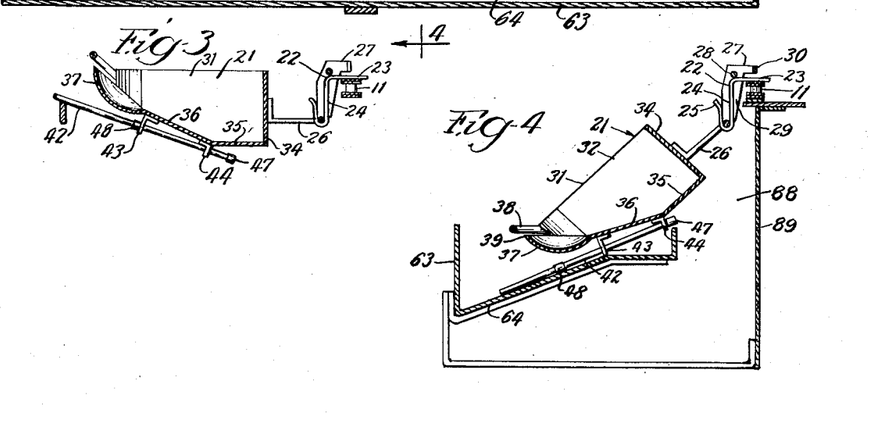
Fig. 3 is a section taken on the line 3—3 of Fig. 1, to an enlarged scale.
Fig. 4 is a section taken on the line 4—4 of Fig. 2.
Figure 5:
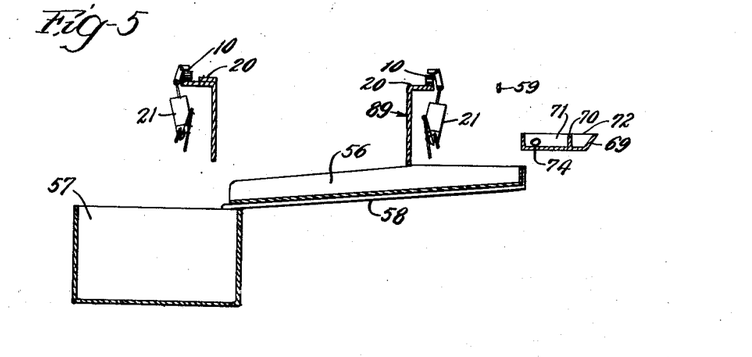
Fig. 5 is a section taken on the line 5—5 of Fig. 1.

A receptacle supporting rail 51 is arranged on brackets 52 and 53 to support the receptacles 21 in normal horizontal position as shown in Fig. 3 by engaging beneath the projecting ends of the rod members 42, the latter being in extended position. As successive receptacles 21 are moved into position at the cracking station 50 they receive the egg contents of successive broken eggs, the combined white and yolk of a single egg being dumped into the tray portion 31 of each receptacle and falling initially on the bottom members 35 and 36. The receptacles 21 are retained by the rail 51 in a horizontal position along a portion of the path of movement thereof which constitutes an inspection station 54, permitting visual inspection of the egg contents of each receptacle by the operator of the machine who is positioned at the station 54. During this movement, if the operator observes that an egg contents is spoiled, damaged, or otherwise objectionable the receptacle 21 in which it is found may be readily detached from its supporting bracket 22 and completely removed from the conveyor 10. Alternatively, it may be noted for disposition at a further point along the path of travel of the conveyor in the following manner. If the operator observes an egg contents in which the yolk is broken but the egg is otherwise unspoiled the receptacle may be conditioned for dumping of the entire contents thereof by moving the slide rod 42 to its innermost or retracted position. With the rod 42 retracted the receptacle 21 remains in the horizontal position until it reaches the end 55 of the support bar 51 whereupon it pivots on the bail 26 and dumps the entire contents of the receptacle 21 into a chute 56 (Fig. 5) which extends beneath the conveyor 10 to a whole egg receptacle 57 preferably positioned at the opposite or far side of the conveyor 10. An adjoining chute 58 extends at the inspection station 54 beneath the cracking station 50 and permits the operator to salvage as whole egg the contents of any receptacle 21 which may have been removed from the conveyor and subsequently found to be unspoiled, or any whole egg contents which has been removed from the conveyor because of the deposit in the receptacle 21 of a portion of the shell or other foreign material which can be readily removed by the operator.

The supporting rail or bar 51 terminates at the end 55 where an auxiliary rail 59 is secured in outwardly offset relation to the rail 51 and extends from the terminus 55 to a further rail section 60.

Figure 6:
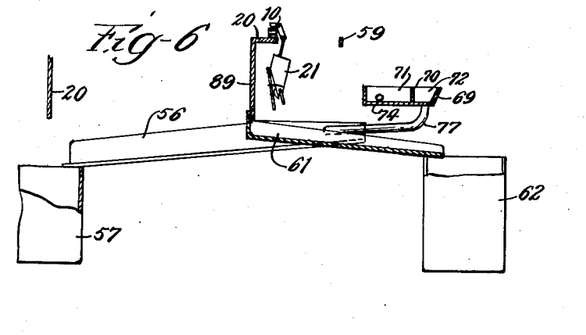
Fig. 6 is a section taken on the line 6—6 of Fig. 1.

The supporting rail section 59 is connected by angular end sections to the longitudinally spaced ends of the rails 51 and 60. The rail section 59 extends for a sufficient distance to permit dumping of selected receptacles 21 at two different points along the same. Immediately adjacent the end 55 of the rail 51 the chute 56 is provided beneath the rail section 59 to receive whole and edible eggs as heretofore described. An adjoining chute 61 is positioned in spaced relation to the chute 56 and is inclined forwardly and downwardly so that its open side drains into a collecting receptacle 62 positioned beneath the same. The chute 61 (Fig. 6) is provided to permit the operator to dispose of or dump the entire contents of a receptacle 21 when it is observed that the contents of such receptacle is inedible. The operator dumps the contents of the receptacle 21 into the chute 61 by manually retracting the supporting rod 42 immediately after the receptacle passes the chute 56. When a receptacle 21 is dumped to dispose of its contents either into collecting chute 56 or chute 61 the receptacle remains attached to the conveyor chain 11 and is advanced along the path of the conveyor in a suspended generally vertical position to the washing mechanism, which will be described.

The supporting rail section 60 is inclined in the direction of the advancing movement of the conveyor to permit the receptacles 21, which remain in horizontal position with the supporting bar 42 extended, to be tilted to a position where the top edge 39 of the cup portion 37 of the receptacle is substantially horizontal, thereby causing the white of the egg to flow out over the same and into a collecting receptacle or pan 63 which extends in outwardly offset relation beneath the conveyor 10 at this point. The bottom or floor portion 64 of the pan 63 is tilted or angled to support the receptacles 21 as they move thereover so that the white of the egg, which tends to cling to the yolk in the cup 37, is dragged across a substantial amount of the floor 64 and is thereby frictionally pulled loose from the receptacle 21. The pan 63 is tilted lengthwise at an angle sufficient to cause the egg white or albumen accumulated therein to drain towards the far end of the same in the direction of the advancing movement of the receptacles 21. The pan 63 extends a substantial distance along the front of the conveyor and around the end thereof, with the end portion 65 terminating at the partition forming end wall 66.

Adjacent the end wall 66 a drainage outlet 67 is provided which is connected by a hose or other conduit 68 to an inspection tray or pan 69 at the inspection station 54. The inspection pan 69 (Figs. 1, 5 and 6) is generally elongate and relatively shallow. It is divided by a lengthwise extending partition 70 into two compartments 71 and 72. The conduit 68 is connected with the inspection pan 69 through an aperture 73 in an end wall and delivers the egg whites from the collecting pan or tray 63, 65 into the compartment 71. An aperture 74 at the other end of the compartment 71 which is located somewhat above the bottom of the pan delivers the egg whites to a conduit 75 which empties into a final receiving vessel (not shown). The other compartment 72 is provided with a discharge opening 76 in the bottom thereof which is connected by the conduit 77 with the chute 56 for delivery of the contents thereof to the whole egg receptacle 57. The operator at station 54 is able to observe the condition of the egg white material as it accumulates in the inspection pan 69 and to remove any portions of or other undesirable material which may be observed therein by scraping the same across the partition 70 and into the compartment 72 by means of a paddle or the like which is provided for use by the operator for such purpose, such material not being objectionable in the whole egg accumulating receptacle 57.

Figure 7:
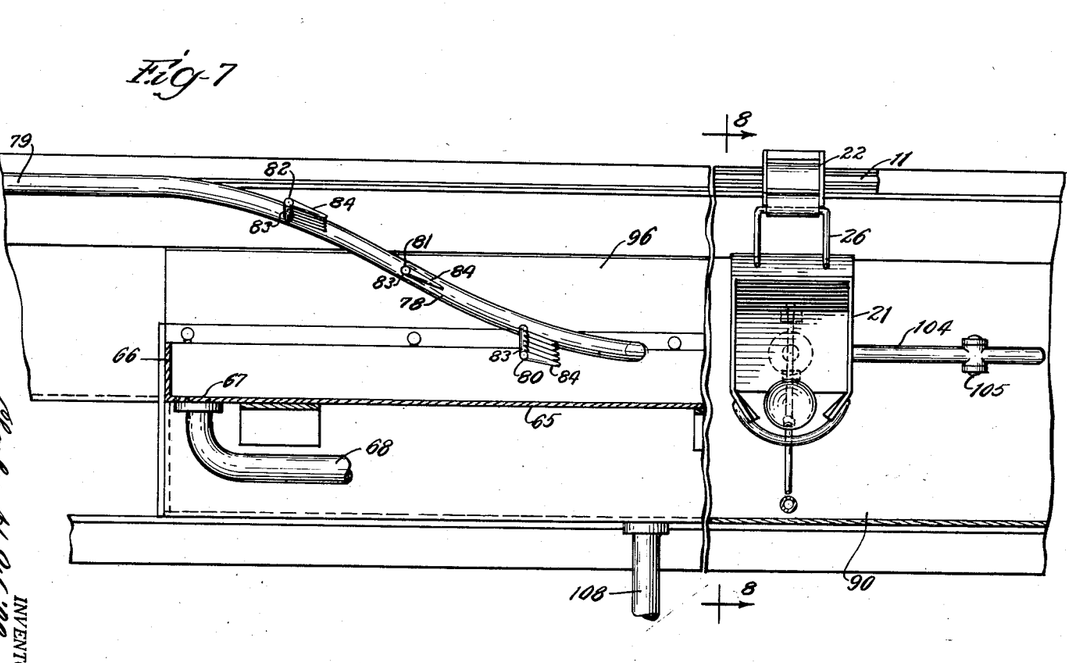
Fig. 7 is a vertical section taken on the line 7—7 of Fig. 1, to an enlarged scale and with portions broken away.
Figure 8:
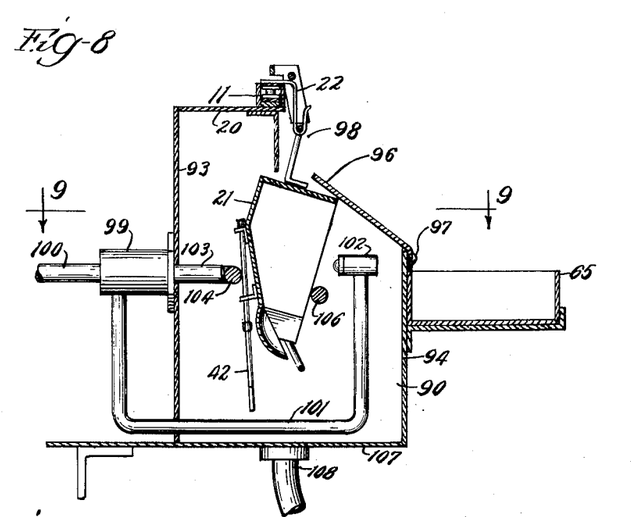
Fig. 8 is a section taken on the line 8—8 of Fig. 7.
Figure 9:
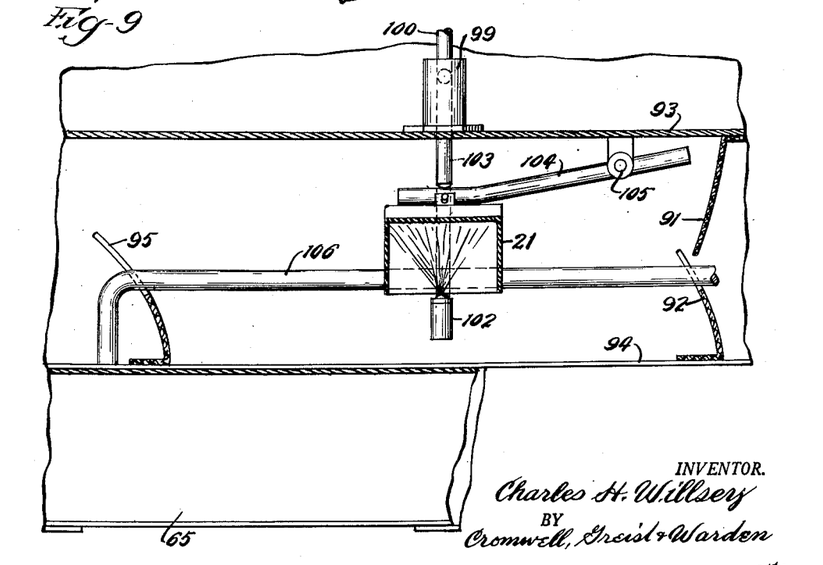
Fig. 9 is a section taken on the line 9—9 of Fig. 8.
Figure 10:
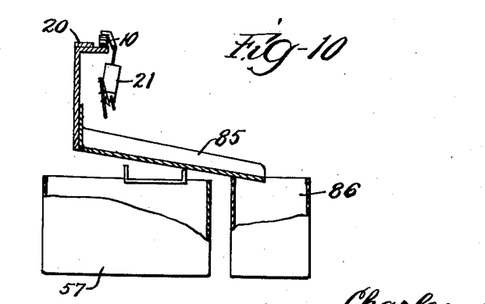
Fig. 10 is a section taken on the line 10—10 of Fig. 1.

As the receptacles 21 move around the end of the conveyor above the collecting pan portion 65 they are raised to a horizontal position by an upwardly inclined portion 78 of a rail or supporting bar 79 which extends around to a point at the far side of the conveyor 10. The upwardly inclined portion 78 of the rail 79 has mounted thereon in spaced relation a plurality of spaced comblike elements 80, 81 and 82 (Figs. 1 and 7) which are provided for engaging the egg whites which are not pulled loose from the yolks by frictional engagement with the bottom of pan 63. The comb-like devices 80, 81 and 82 may be identical except for the angle at which they extend outwardly of the rail portion 78.

Each of the comb-like devices comprises a supporting bar 83 extending outwardly from the supporting rail section 78 and having mounted thereon a plurality of spaced wire-like teeth 84. The egg white is dragged across the successive comb arrangements 80, 81 and 82 if it has not already been pulled loose from the receptacle 21 by movement across the bottom 64 of the pan 63. The teeth 84 exert a further frictional pull on the trailing portion of the egg white to loosen it from the yolk and from clinging engagement with the receptacle 21 for deposit in the collecting pan 63.

With the arrangement described the egg white is separated from the yolk and deposited in the pan 63 as each receptacle 21 is advanced to the rail 79, on which the receptacles, carrying the yolk only, are supported until they reach the chute 85 on the far side of the machine where the supporting rail 79 terminates and the receptacles are dumped to deliver the yolk to the chute 85 and into a suitable receptacle 86 for accumulating the same.

An accumulating or collecting pan 87 is provided along the conveyor at the rear of the mechanism beneath the path of travel of the receptacles 21, extending from the pan end or partition 66 to a point beneath the yolk delivery chute 85 in downwardly inclined relation so that it drains into the whole egg receiving tank 57, thus disposing of any egg white which may drain from the receptacles 21 after they pass the end wall 66 of the pan 63.

An apparatus for washing and sterilizing the receptacles 21 from which the contents have been dumped at the chutes 56 and 61 is arranged at the end of the conveyor (Figs. 4, 7, 8 and 9). The dumped receptacles 21 hang free in depending relation from the conveyor chain 11 and pass in back of the albumen collecting pan 63, in the space 88 provided between the pan 63 and the frame member or apron 89 which extends below the conveyor chain 11 as the receptacles move along the front of the conveyor and to the washing compartment.

The washing mechanism is enclosed in a compartment 90, extending at the end of the conveyor, which compartment is open at the opposite ends to provide for passage of the receptacles 21. At the approach end splash guard members or flexible baffles 91 and 92 are arranged which are secured along their vertical edges to the compartment back and front wall forming members 93 and 94, respectively. At the exit end of the compartment 90, a single baffle member 95 is provided which is secured to the front wall member 94. A portion of the top of the compartment 90 is normally closed by a removable shield or cover member 96 which is detachably connected by screws 97 or other fastening means to the front wall member 94 and extends diagonally downwardly and outwardly of the conveyor chain 11 with an aperture 98 being provided to permit passage of the depending receptacles 21 through the compartment. The cover member 96 is arranged to permit the receptacles 21 which have not been dumped to extend downwardly and outwardly of the conveyor 10, at the proper angle for drainage of the egg white into the end portion 65 of the collecting pan 63 which extends along and is supported from the wall member 94 at this end of the conveyor.

The inner or back wall member 93 of the compartment supports, intermediate the top and bottom edges thereof, a valve 99 which is connected by conduit 100 with a washing fluid supply, which may be hot water or the like. The valve 99 is also connected by means of conduit 101 with a nozzle 102 which is positioned within the compartment 90 adjacent the outer wall 94 and directed toward the inner wall 93 so that liquid discharged through the same will strike the depending receptacles 21 as they move past the same in the compartment 90. The valve 99 is provided with a spring pressed operating plunger 103 which extends through the wall 93 and is engaged by a trip lever 104, the latter being pivoted at 105 to the wall 93, and being operable by engagement with the receptacles 21 as they pass in front of the same. Preferably, a guide rod 106 extends horizontally through the compartment 90 and holds the depending receptacles 21 in proper position to strike the valve operating trip lever 104 as they approach and move past the nozzle 102. The bottom wall 107 of the compartment 90 is apertured and provided with a suitable drainage connection 108 to permit of disposal of the liquid used in washing the receptacles 21. The receptacles 21 as they emerge from the washing compartment 90 and pass the baffle 95 remain in depending relation until they reach the upwardly inclined end 109 of the supporting rail 51 which moves them into horizontal position together with other receptacles 21 which have not passed through the washing apparatus. The drip pan 87 and the yolk discharge chute 85 are arranged so that there is clearance adjacent the conveyor 10 for passage of the cleaned and sterilized receptacles 21 after they leave the washing apparatus.

While only one chute 85 is provided for receiving the egg yolks, additional means for separating light and dark yolks may be provided such as the arrangement shown in my copending application, Serial No. 315,447, now Patent No. 2,760,536, dated August 28, 1956, which permit the operator to position the supporting bars or rods 42 for selective dumping as required for the separation. The positioning of the bar 42 would, of course, be accomplished by the operator subsequent to passage of the receptacle 21 beyond the supporting bar 59.

The various drip pans and chutes 58, 56, 61, 63, 87 and 85 are all supported on suitable brackets extending from the machine frame 20 and preferably are readily removable or detachably supported or attached to the same so that they may be easily removed for cleaning when required. The receptacles 21 are, of course, detachably mounted on the chain 11 and may be removed for individual cleaning and sterilization at any time. All other parts which are likely to come in contact with the egg contents and which are not removably mounted may be readily cleaned on the machine, so that the entire mechanism may be kept in a sanitary condition at all times.

While specific details of construction have been referred to in describing the illustrated form of the mechanism it will be understood that other details of construction may be resorted to within the spirit of the invention.

I claim:

1. An egg contents separating mechanism comprising a supporting structure, a traveling conveyor mounted thereon and having means for moving the same in a horizontal path, a plurality of egg receiving receptacles pivotally mounted on said conveyor for swinging movement from a horizontal to a vertical plane while they are moved in a horizontal path by the conveyor, said receptacles each comprising a body portion extending outwardly of the conveyor which is adapted to receive the contents of a whole egg while said receptacle is supported in a horizontal plane and to dump said contents when it is swung to a vertical plane, said body portion including an outwardly and upwardly sloping outer side wall portion, and an upwardly opening yolk receiving cup secured at its uppermost edge to a portion of the outer edge of said sloping side wall, said yolk cup having free edge portions, whereby when said receptacle is swung downwardly through a predetermined angle said yolk cup will be positioned in a substantially horizontal plane to receive the egg yolk from the body portion and permit the white to separate therefrom by spilling over the free edge portions of said yolk cup, means extending along a predetermined portion of the path of said conveyor for supporting each receptacle in a horizontal position while the contents of an egg is dumped therein, means extending along another portion of the path of said conveyor for thereafter supporting each receptacle in a tilted position to permit separation of the egg white from the yolk, and a plurality of spaced comb-like members positioned along the path of travel of the receptacles so that the receptacles pass above the same while they are supported in a tilted position to engage therewith clinging portions of the egg whites.

2. An egg contents separating mechanism comprising a supporting structure, an endless traveling conveyor mounted thereon, a plurality of egg receiving receptacles pivotally mounted in outwardly projecting relation on said conveyor, said receptacles each comprising a pan-like body portion adapted to receive the egg contents when said receptacle is supported in a horizontal plane, said body portion including an outwardly and upwardly sloping outer side wall terminating in a yolk receiving cup at the outer edge thereof whereby when said receptacle is swung downwardly through a predetermined angle said yolk cup will be positioned in a substantially horizontal plane to receive the egg yolk from the body portion of the receptacle and permit the white to drain over the edges of said yolk cup, and means at a predetermined point along the path of said conveyor for supporting said receptacles in horizontal outwardly extending position for receiving the egg contents, means at another point along the conveyor for supporting successive receptacles in a downwardly tilted position to permit separation of the whites from the yolks, and a toothed comb-like formation arranged adjacent said conveyor beneath the path of movement of the receptacles and in position to engage the teeth thereof with the egg white as it drains over the edges of the yolk cup when said yolk cup passes over said comb-like formation.

3. An egg contents separating mechanism comprising a supporting structure, a traveling conveyor mounted thereon, a plurality of egg receiving receptacles pivotally and movably mounted on said conveyor for swinging movement from a horizontal to a vertical plane, said receptacles opening upwardly and being adapted to receive the whole egg contents while they are supported in a horizontal plane and to dump said contents when they are permitted to swing to a vertical plane, said receptacles each including a yoke receiving cup at the outermost edge thereof which is adapted to be positioned in a substantially horizontal plane to receive the egg yolk and permit the white to separate therefrom by spilling over the edge portion thereof when the receptacle is tilted to a predetermined angular position during a portion of its travel, a manually adjustable member mounted on each of said receptacles for movement between a retracted position and an extended position where it projects beyond the end of the receptacle, a support means spaced outwardly of said conveyor and extending a predetermined distance along said conveyor for engaging the manually adjustable members and thereby supporting the receptacles in a horizontal plane while the contents of an egg is dumped into each successive receptacle, a second support means spaced outwardly of the first mentioned support means and extending along the conveyor from a point adjacent the end of said first mentioned support means for engaging the manually adjustable members and supporting the receptacles in a horizontal plane when said manually adjustable members are in extended position only and when said receptacles are advanced by said conveyor beyond said first support means, collecting containers mounted below said second support means for receiving the entire contents of the receptacles on which the manually adjustable members are retracted, and a third support means extending beyond said second support means along said conveyor at a lower elevation for engaging the manually adjustable members to thereby support the receptacles in a tilted position for separation of the whites from the yokes, said receptacle support means being arranged in succession along said conveyor.

4. An egg contents separating mechanism comprising a supporting structure, an endless conveyor mounted thereon for movement in a horizontal plane, a plurality of egg receiving and separating receptacles pivotally mounted on said conveyor for downward swinging movement from an outwardly extending horizontal plane to a vertical plane, said receptacles each comprising a body portion which is constructed to receive the whole egg contents while said receptacle is supported in a horizontal plane and to dump said contents over the outer edge of the receptacle when it is permitted to swing to a vertical plane, said body portion including a bottom wall having an outwardly and upwardly sloping outer portion which is provided with a cup-like recess formation for receiving the yolk and with an aperture spaced above the bottom of said recess whereby when said receptacle is supported in a downwardly tilted position with said recess forming portion in substantially horizontal position the egg yolk will move from the body portion into the recess and permit the white to pass through said aperture and separate from the yolk, means mounted along said conveyor for supporting each receptacle in a horizontal position while the contents of an egg is dumped therein, a series of successive supporting members mounted in outwardly spaced relation to and along said conveyor for engaging in supporting relation with each receptacle at a point which extends outwardly of the conveyor as the receptacle is advanced by the conveyor, the first one of said receptacle supporting members positioning each of the receptacles in a horizontal plane while the contents of an egg is dumped therein, a series of collecting containers supported at successive points along said conveyor below said receptacle supporting members, said receptacles each having a member movably mounted thereon which is adapted to be moved to a position to engage the second one of said receptacle supporting members or to a position to clear said second receptacle supporting member and permit said receptacle to swing to a vertical position to dump the contents into the collecting container beneath the same, and a third one of said receptacle supporting members extending along said conveyor at a lower elevation for supporting the receptacles in a downwardly tilted position to permit the white to drain into the collecting container below the same.

5. An egg contents separating mechanism comprising a traveling conveyor, a plurality of egg contents receiving receptacles pivotally mounted on said conveyor for swinging movement from an outwardly extending horizontal position to a vertical depending position, a bar extending a predetermined distance along said conveyor and outwardly spaced therefrom for cooperating with said conveyor and said receptacles to support said receptacles in a horizontal position while receiving the egg contents therein, an elongate pan at the end of said bar in the direction of advancing movement of said conveyor having a portion thereof positioned to engage beneath the receptacles which move over said bar and to support the same in an intermediate outwardly and downwardly inclined position to thereby cause separation of the white from the yolk and deposit of the white in said pan, means forming a vertically extending passageway between said conveyor and said pan which is located to accommodate receptacles which are swung to a depending vertical position on said conveyor, a container for receiving whole eggs positioned adjacent said bar and at the entrance of said passageway, and said receptacles having means movably connected therewith for selectively adjusting said receptacles for engagement and non-engagement with said bar after said receptacles have received the egg contents, whereby selected receptacles may be adjusted to swing downwardly and inwardly to a vertical position to dump the entire contents into said container and to move into said passageway, said last mentioned receptacles being thereafter carried by the conveyor through said passageway.

6. An egg contents separating mechanism comprising an endless horizontal conveyor, a plurality of egg receiving receptacles pivotally mounted on said conveyor for swinging movement from a horizontal laterally extending position to a vertical depending position, a bar extending along a portion of the conveyor and spaced laterally therefrom for supporting said receptacles in a horizontal position while they receive the egg contents, an elongate pan supported along said conveyor at the leading end of said bar for engaging beneath and supporting said receptacles in an intermediate inclined position to thereby cause separation of the white from the yolk when said receptacles are advanced from said bar to said pan, means forming a vertical passageway extending between said conveyor and said pan which is of sufficient width to accommodate receptacles which are carried in depending vertical position on said conveyor, a container positioned between said bar and said conveyor for receiving the entire contents of certain of said receptacles, and said receptacles having means movably connected thereto which is manually adjustable to a position for engagement or non-engagement with said bar whereby said means may be adjusted on selected receptacles to a position for non-engagement with said bar so as to cause said receptacles to swing free of engagement with said bar above said container before they reach said pan, thereby dumping the entire contents into said container and positioning said receptacles for movement into said passageway as they are advanced by movement of said conveyor.

7. A device for use in apparatus for effecting the gravity separation of egg whites from egg yolks wherein the apparatus comprises one or more separating receptacles carried in outwardly extending relation on a traveling conveyor, said device comprising a plurality of members arranged in spaced outwardly extending relation along the conveyor and beneath the separating receptacles, and said members having spaced teeth positioned to engage with the white which clings to the receptacles and hangs downwardly therefrom.

References Cited in the file of this patent
UNITED STATES PATENTS

| | | |
|---|---|---|
| 1,747,432 | Eskholme | Feb. 18, 1930 |
| 2,060,683 | Mohr | Nov. 10, 1936 |
| 2,229,349 | Sigler | Jan. 21, 1941 |
| 2,443,188 | Hodson | June 15, 1948 |
| 2,646,163 | Sigler | July 21, 1953 |
| 2,723,695 | Willsey | Nov. 15, 1955 |

U. S. DEPARTMENT OF COMMERCE
PATENT OFFICE

CERTIFICATE OF CORRECTION

Patent No. 2,818,096                                December 31, 1957

Charles H. Willsey

It is hereby certified that error appears in the printed specification of the above numbered patent requiring correction and that the said Letters Patent should read as corrected below.

Column 8, line 45, for "yoke" read --yolk--; line 75, for "yokes" read --yolks--; column 9, line 42, for "beenath" read --beneath--; column 10, line 5, for "receeptacles" read --receptacles--.

Signed and sealed this 8th day of April 1958.

(SEAL)
Attest:
KARL H. AXLINE
Attesting Officer

ROBERT C. WATSON
Commissioner of Patents